US010438728B2

(12) United States Patent
Pyron (10) Patent No.: US 10,438,728 B2
(45) Date of Patent: *Oct. 8, 2019

(54) ELECTRICAL POWER LINE CLAMPING INSULATOR (71) Applicant: Aluma-Form, Inc., Memphis, TN (US)

(72) Inventor: Roger Pyron, Arlington, TN (US)

(73) Assignee: ALUMA-FORM, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,892

(22) Filed: Nov. 7, 2018

(65) Prior Publication Data
US 2019/0074111 A1 Mar. 7, 2019

Related U.S. Application Data (63) Continuation of application No. 15/664,672, filed on Jul. 31, 2017, now Pat. No. 10,134,509.

(51) Int. Cl.
H01B 17/14 (2006.01)
H02G 3/04 (2006.01)
(Continued)

(52) U.S. Cl.
CPC ............ H01B 17/14 (2013.01); H01B 17/22 (2013.01); H02G 3/0456 (2013.01); H02G 7/05 (2013.01)

(58) Field of Classification Search
CPC ....... H01B 17/14; H01B 17/22; H02G 3/0456
(Continued)

(56) References Cited

U.S. PATENT DOCUMENTS 3,147,338 A 9/1964 Ekvall et al.
3,547,386 A * 12/1970 Clarke .................. F16L 3/14
174/144
(Continued)

FOREIGN PATENT DOCUMENTS

CN 104868424 A 8/2015
EP 2899438 A1 7/2015
(Continued)

OTHER PUBLICATIONS

The United Patent and Trademark Office; The International Search Report and the Written Opinion of the International Searching Authority, or the declaration; PCT/US2018/044472 International Search Report and Written Opinion; dated Sep. 25, 2018; pp. 1-12; The United States Patent and Trademark Office; US.
(Continued)

Primary Examiner — Dimary S Lopez Cruz
(74) Attorney, Agent, or Firm — Wyatt, Tarrant & Combs, LLP; Max E. Bridges; Stephen C. Hall (57) ABSTRACT A clamping insulator for securing electrical wires to support structures comprising an insulating second clamp member, and an insulating first clamp member that is hingebly connected to the insulating second clamp member and an eyebolt, wherein the hinge is positioned at an angle relative to the electrical wire, the first clamp member is simply flipped over upon the second clamp member to secure the wire in place, the eyebolt both secures the first and second clamp members in the closed position and allows easy access for a lineman with a hot stick, and, in the closed position, the eyebolt is positioned at a compound angle relative to the ground and supporting structure it sits upon to provide easy access for a hot stick.

10 Claims, 12 Drawing Sheets (51) Int. Cl.
*H02G 7/05* (2006.01)
*H01B 17/22* (2006.01)

(58) Field of Classification Search
USPC ........................................................ 174/174
See application file for complete search history.

(56) References Cited

U.S. PATENT DOCUMENTS

| | | | |
|---|---|---|---|
| 4,263,478 | A | 4/1981 | Willem |
| 4,402,540 | A | 9/1983 | Willem et al. |
| 4,434,978 | A | 3/1984 | Kloster |
| 4,579,306 | A | 4/1986 | Kellett et al. |
| 5,837,943 | A | 11/1998 | Kellett |
| 5,933,924 | A | 8/1999 | Nowlen |
| 6,005,196 | A | 12/1999 | Spillyards |
| 6,047,930 | A | 4/2000 | Bello |
| 6,135,398 | A | 10/2000 | Quesnel |
| 6,170,783 | B1 | 1/2001 | Bello |
| 6,198,042 | B1 | 3/2001 | Huston |
| 6,303,856 | B1 | 10/2001 | Bello |
| 6,418,266 | B1 | 7/2002 | Vitantonio |
| 6,595,472 | B1 | 7/2003 | Pisczak |
| 6,721,483 | B2 | 4/2004 | Grubish et al. |
| 6,726,166 | B2 | 4/2004 | Goodman |
| 6,892,990 | B2 | 5/2005 | Pisczak |
| 7,295,133 | B1 | 11/2007 | McCollough |
| 7,432,449 | B2 | 10/2008 | Kim |
| 7,588,224 | B2 | 9/2009 | Bernstorf et al. |
| 7,605,331 | B2 | 10/2009 | Cho |
| 7,692,100 | B2 | 4/2010 | Boisclair |
| 7,772,500 | B2 | 8/2010 | Cho et al. |
| 7,805,814 | B2 | 10/2010 | Cho |
| D689,824 | S | 9/2013 | Ng et al. |
| 8,820,715 | B2 | 9/2014 | Jean et al. |
| 9,093,202 | B2 | 7/2015 | Chan |
| 9,343,204 | B2 | 5/2016 | Clement et al. |
| 9,379,527 | B2 | 6/2016 | Jean et al. |
| 9,548,598 | B2 | 1/2017 | Tally et al. |
| 2010/0018014 | A1 | 1/2010 | Boisclair |
| 2014/0367531 | A1 | 12/2014 | Burns et al. |
| 2016/0294074 | A1 | 10/2016 | De France et al. |

FOREIGN PATENT DOCUMENTS

| | | |
|---|---|---|
| JP | 2009-252374 A | 10/2009 |
| JP | 2010-129534 A | 6/2010 |

OTHER PUBLICATIONS

The United States Patent and Trademark Office; The International Search Report and the Written Opinion of the International Searching Authority, or the declaration; PCT/US2018/044472 International Search Report and Written Opinion; dated Sep. 25, 2018; pp. 1-12; The United States Patent and Trademark Office; US.

* cited by examiner

ELECTRICAL POWER LINE CLAMPING INSULATOR

CROSS REFERENCE TO RELATED U.S. APPLICATION

This continuation patent application claims the benefit of and priority to U.S. Pat. No. 10,134,509, which issued on Nov. 20, 2018, the contents of which are fully incorporated herein by reference in its entirety and is claimed as a basis for priority.

FIELD OF INVENTION

The embodiments described herein relate to insulators and clamps for electrical utility lines. The clamping insulators of the present embodiments integrate an improved clamp to secure the wires to the insulators, as well as features to provide greater bearing force on the wire and to provide easier installation and removal of insulators.

BACKGROUND

An electrical insulator acts as a barrier between the electricity flowing in a charged electrical utility line and the ground. For brevity, the term "electrical wire" or, for brevity, "wire" (including plural forms), is used herein to encompass various conduits through which electricity passes including wires, cables, and utility lines.

Conventionally, wires are attached to and supported by poles, towers, and other support structures by both an insulator and a clamping arrangement to secure the live line to the insulator. Typically, the clamping arrangement includes an insulator and a clamping device comprising a body member on which the line is placed and a clamping arm which is seated over the line and bolted to the body member using bolts, nuts, and washers. In other conventional examples, the electrical wire is secured to the insulator by the use of a vice-like arrangement that presses against the wire from the left and right side by tightening the nuts and bolts.

Electrical utility workers, or linemen, are generally not allowed to touch the insulator through which a charged wire passes. Instead, the lineman are required to utilize an insulated pole known as a "hot stick" or "switch stick" to protect them from electric shock and to provide physical separation from the insulator to reduce the chances of burns. Hot sticks are usually made of fiberglass and are made in variety of lengths, from a few feet up to forty feet in length. However, most hot sticks are typically six to ten feet in length.

While insulated hot sticks provide safe contact with energized equipment, their use presents a number of disadvantages in installing, tightening, removing, and loosening the typical conductor from an insulator. This operation requires the lineman to meticulously manipulate the hot stick in order to tighten or loosen the nuts and bolts of the typical clamping arrangement. Typically, said bolt is positioned parallel to the ground which makes it difficult to access the eyelet or bolt with a hot stick. This extensive and meticulous operation presents obvious safety hazards to the lineman and results in an inefficient and time consuming process for most electrical line crews.

The conventional electrical power line clamp presents other disadvantages. This includes the opportunity for parts, such as nuts and bolts, to be dropped during the installation or removal process. Rather than carrying a clamping apparatus that also serves as an insulator, the conventional arrangement also requires linemen to carry separate insulators and clamps for the installation and removal process. Moreover, because conventional electrical clamps are not universally adapted to secure electrical wires of various diameters, linemen are often required to carry a variety of clamp sizes for securing electrical wires of different sizes.

Some conventional clamping arrangements utilize a clamping device comprising a body member on which the line is placed and a clamping arm. The clamping arm is then seated over the line and bolted to the body member so they are hingebly connected. When the electrical wire is secured to the clamp in this typical arrangement, the electric wire runs parallel to the axis of the hinge that secures the clamping arm to the body member and also runs perpendicular to the clamping arm itself. Furthermore, when the electrical wire is secured to the clamp in the conventional arrangement, the electrical wire is equidistant from the axis of the hinge and the end of the clamping arm in the closed position such that a "symmetrical fulcrum" effect is utilized to secure the wire. However, in this conventional arrangement the symmetrical fulcrum effect and the parallel relationship between the electrical wire and the axis of the hinge do not provide a sufficient bearing force directly on the electrical wire to secure it in place. Herein, the term "axis" refer to an imaginary line about which rotation occurs (e.g., hinge axis 50) or the term axis can be a reference line used in defining one or more angles (examples include fixture axis 72 and longitudinal axis 78, described below).

Accordingly, there is a significant need for a clamping insulator that provides greater bearing force directly on the wire and can be easily manipulated using a hot stick. Such an improvement would further reduce certain hazards to linemen and limit the time required for installation and removal of the insulator. There is a need for an integrated insulator and clamp suitable for a variety of electrical wire diameters. Likewise, it is desirable for an insulated clamp to utilize an eyebolt, or a similar type of attachment, instead of nuts and bolts for securing the wire to the insulator. Along with other features and advantages outlined herein, clamping insulators within the scope of present embodiments meet these and other needs. In doing so, the inventive apparatuses provide greater bearing force directly on the wire, easier installation and removal of the insulator. Moreover, the use of an eyebolt or a similar type of attachment for securing the clamp in the closed position allows a lineman to easily manipulate the insulated clamp by the use of a hot stick, and a clamping apparatus with insulator adapted for accommodating a variety of wire diameters.

SUMMARY OF EMBODIMENTS

A clamping insulator, sometimes referred to herein as "clamping apparatus" or "clamp" for brevity, according to present embodiments provides greater direct bearing force directly to the wire, with easier installation and removal. Structurally, the clamps of the present embodiments comprise a fixture for holding specific parts in certain positions during engagement with a wire, i.e., for securing a first clamp member in a position relative to a second clamp member as selectably chosen by a user. The present embodiments allow for easier and safer manipulation of the inventive clamping apparatus, such as by a lineman using a hot stick, with the clamp able to self-adjust to secure a variety of wire sizes.

For illustrative (and non-limiting) purposes, the present embodiments are described with an eyebolt for the fixture, to secure the clamp members in position relative to one another. However, any number of other fixtures besides eyebolts are well known to persons of ordinary skill in the art, which can be used easily with the inventive clamp for securing the positioning of the clamp members when the apparatus is in the closed position. Accordingly, references to an eyebolt or an eyelet are not intended as limiting of the scope of embodiments.

Current embodiments provide for a clamping insulator with a first clamp member that can be either opened or closed relative to the second clamp member. In this way, the first clamp member is connected to the second clamp member in a hinged relationship, i.e., hingebly. This hinge provides a single axis of rotation for the first clamp member relative to the second clamp member. In this embodiment, the hinge allows the first clamp member to simply be flipped or folded over upon the lower member to a closed state in order to secure the electrical wire in place. The first and second clamp members form a channel through which the electrical wire passes through. As will be explained in more detail below, in some embodiments the channel contains a series of grooves which are indentations in the channel surface for receiving at least one insert (shown in non-limiting fashion as a plurality of inserts in the figures). The inserts are formed from known materials that can be used to provide different holding and retention effects directly upon the electrical wire by increasing the friction between the wire and the clamp. Examples of such materials include ceramics, polymers, semi-metallic, or metallic.

In some embodiments, an eyebolt is utilized as the fixture, which both secures the first and second clamp members together and allows a lineman to manipulate the clamp without manual contact. The eyebolt is hingebly connected to the first clamp member of the clamp, such that the eyebolt swivels upon the axis of this eyebolt hinge when the first clamp member is closed or opened. When the clamp is manipulated from the open position to the closed position by the use of a hot stick, the eyebolt engages a fixture receiving notch formed in the second clamp member.

In addition, when the clamp is manipulated from the open position to the closed position, the clamp self-adjusts to secure electrical wires of different diameters. In some embodiments, a lineman can choose to tighten the insulated clamp about the electrical wire based on the application and/or vary the clamping force by accessing the eyelet of the eyebolt with a hot stick, and rotating the eyebolt to tighten the clamp shut. In other embodiments, the eyebolt automatically locks in place, without additional tightening with a hot stick, by merely being folded into the closed position.

In some embodiments, the first and second clamp members are arranged with corresponding angled regions such that when the first clamp member is in the closed position and the eyebolt is automatically secured in place, the eyebolt is positioned at an angle (e.g., including but not limited to 30° in some embodiments) relative to the support structure on which the wire sits, making it easier for the lineman to access the eyelet with the hot stick. When the first clamp member is in the open position and the eyebolt is not secured in placed to the lower member, the eyebolt is also positioned away from the support structure making it easier for the lineman to flip the clamp closed.

The fixture axis rests in a compound angle that also allows orientation relative the ground. This creates easier installation for the lineman by allowing hot stick access from below the plane of the electrically charged wires. Existing vise type products position the eyebolt parallel to the ground requiring difficult access for installation unless the lineman positions themselves dangerously close to the adjacent electrically charged wires.

In conventional insulators that position a wire relative to a utility pole or support structure, the electrical wire runs parallel to the axis of the hinge of the clamping arm, perpendicular to the clamping arm itself, and/or perpendicular to the body member on which the electrical line is placed. Further, in conventional insulators with clamping arms, the electrical line is placed equidistant between the axis of the hinge and the end of a clamping arm when in the closed position, such that the clamping arm creates a symmetrical fulcrum. However, this typical clamping arrangement fails to provide a sufficient bearing force directly on the electrical wire to secure it in place.

According to present embodiments, the electrical wire is placed at an angle relative to the axis of the hinge rather than running parallel. In addition, the wire is not equidistant between the axis of the hinge and the end of the first clamp member when in the closed position. Rather, in these embodiments, the electrical wire is secured in place closer to the hinge point than the point equidistant the hinge axis and the end of the first clamp member when in the closed position. These embodiments create a mechanical force marked by an "asymmetrical fulcrum" effect in which more surface area of the clamp is applied to the wire. As compared to other conventional insulators, the asymmetrical fulcrum effect of the present embodiments results in more pressure directly on the wire to secure it in place (e.g. 1.3 times).

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

MULTIPLE EMBODIMENTS AND ALTERNATIVES

Figure 1:
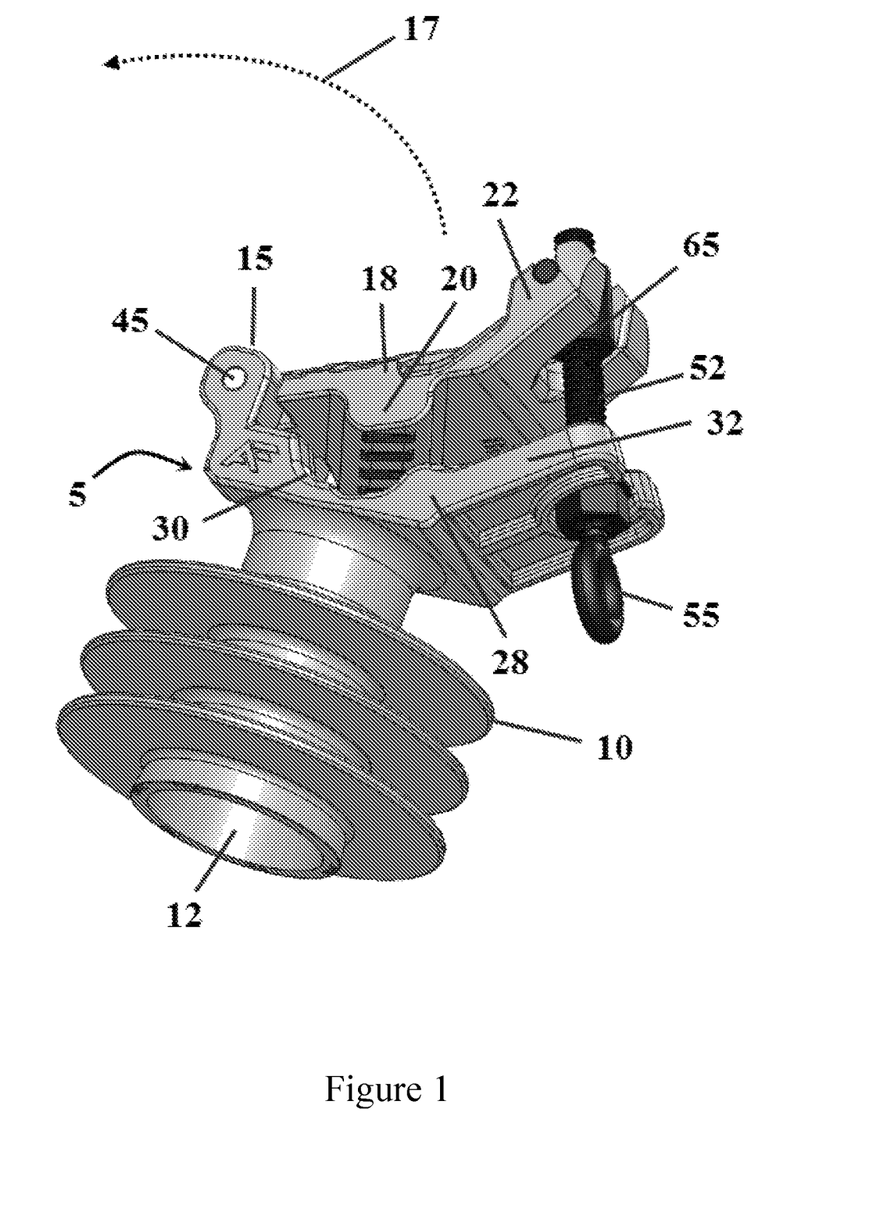
FIG. 1 is a perspective view of a clamping insulator in a closed position, according to multiple embodiments and alternatives.
Figure 9A:
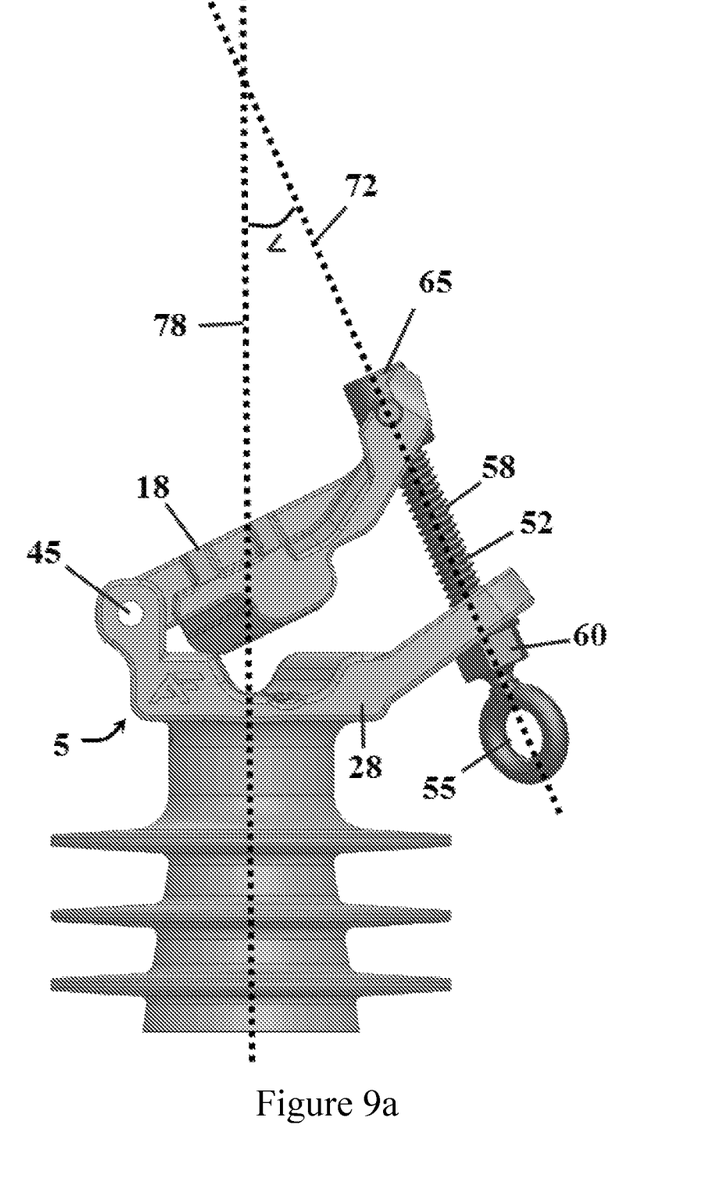
FIG. 9a is a side view of a partially closed clamping insulator with intersecting longitudinal axis and fixture axis, according to multiple embodiments and alternatives.
Figure 10:
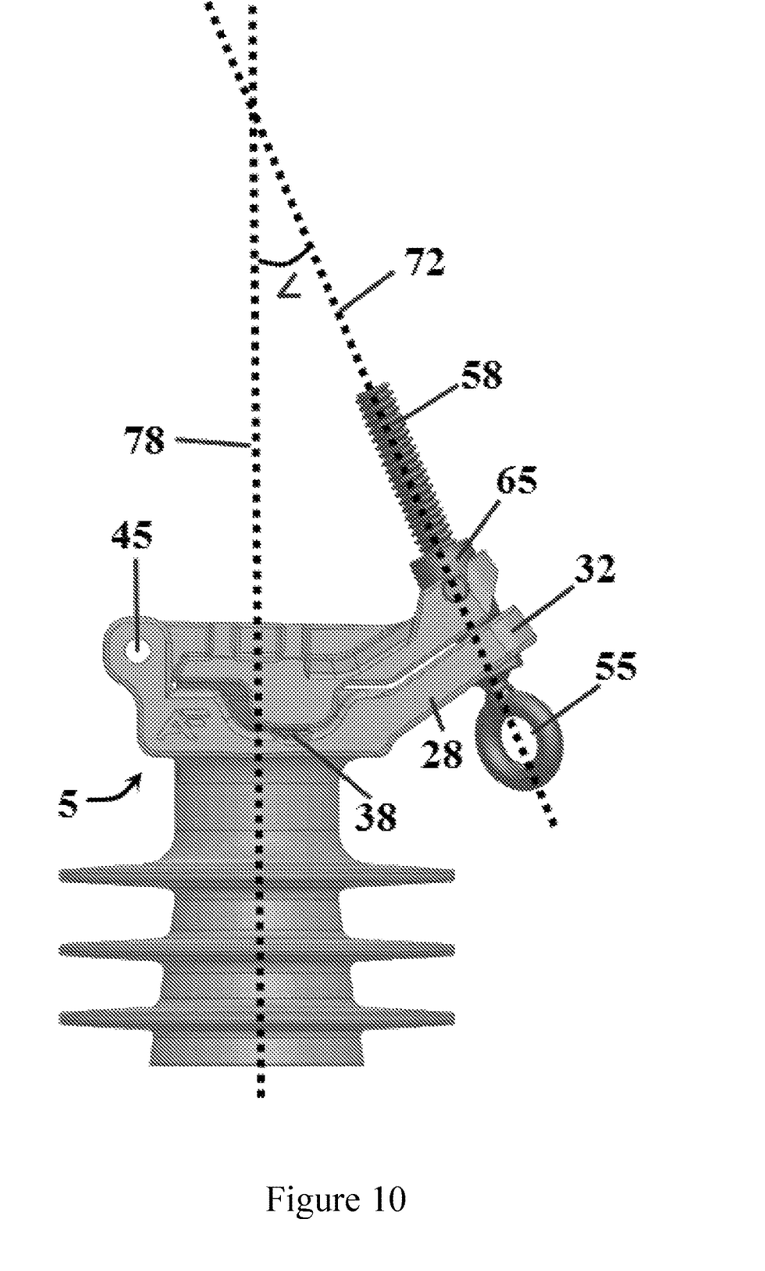
FIG. 10 is a side view of a closed and secured clamping insulator, according to multiple embodiments and alternatives.

FIG. 1 shows clamping insulator 5 in the closed position according to multiple embodiments and inventions. Clamp 15 includes first clamp member 18 and second clamp member 28. First clamp member 18 is attached rotatably to second clamp member 28 by hinge 45. Clamping insulator 5 consists of insulator 10 being coupled to and in non-electrical contact with second clamp member 28. Insulator 10 is positioned relative to second clamp member 28 in a manner that each is not capable of receiving and transferring electrons from one to the other. Insulator 10 may be made from a variety of insulating materials such as clay, plastic, glass, mica, teflon, perfluoroalkoxy, rubber, HDPE or others. In some embodiments, insulator 10 includes hollow region 12 by which the insulator portion 10 of clamping insulator 5 is configured to be mounted to a support structure such as a pole or tower. Because of how insulator 10 is fitted over and otherwise positioned relative to one of these support structures, hollow region 12 generally defines a longitudinal axis 78 as illustrated in FIGS. 9a and 10. The entire assembly of clamping insulator 5 is made from nonconductive material. In some embodiments, insulator 10 and second clamp member 28 are both sections of clamping insulator 5. Insulator 10 and second clamp member 28 are not separate components attached together.

Figure 3:
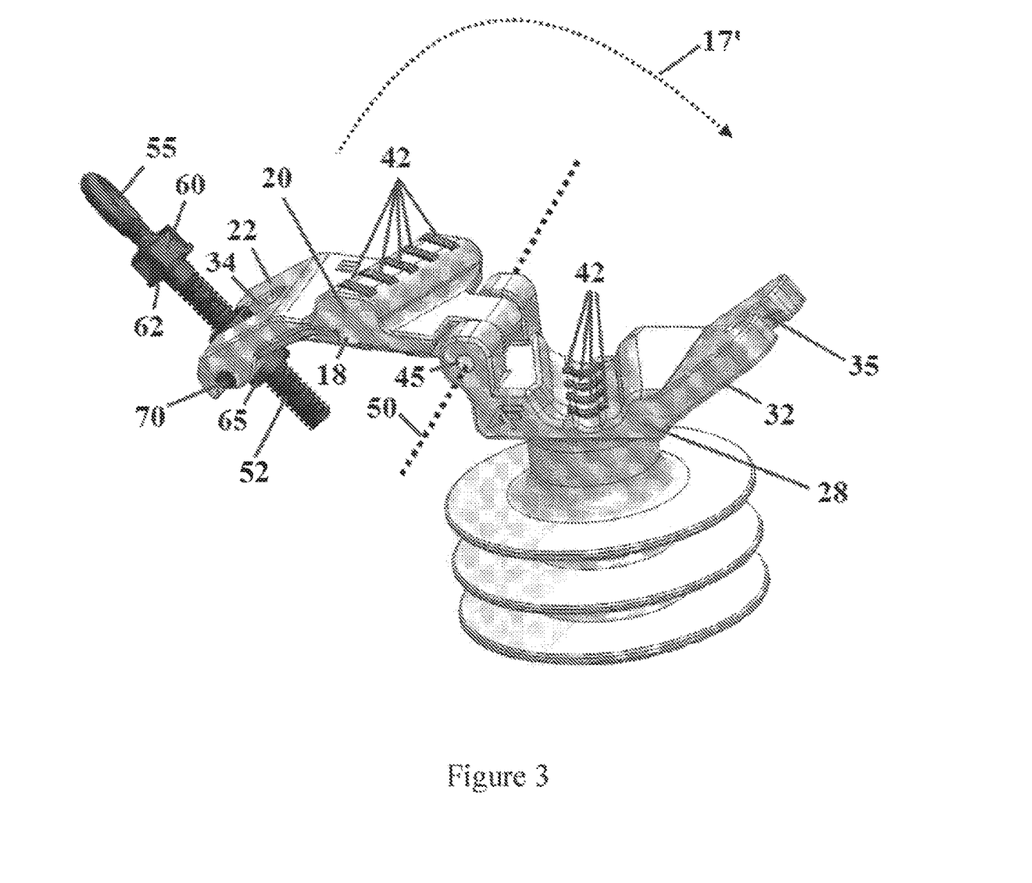
FIG. 3 is an elevation view of a clamping insulator in an open position, according to multiple embodiments and alternatives.

It will be appreciated that in some embodiments first clamp member 18 rotates about hinge 45 relative to second clamp member 28. For example, external rotation is denoted by arrow 17 shown in FIG. 1 and internal rotation denoted by arrow 17' as shown in FIG. 3. In this regard, external rotation is associated with clamp opening and internal rotation is associated with clamp closure. Accordingly, internal rotation produces the clamping force on an electrical cable or other wire to be securely positioned relative to a support structure, while external rotation releases that force.

Embodiments shown in FIG. 1 include first clamp member 18 having protrusion 20 and first angled region 22. Second clamp member 28 consists of second angled region 32 that corresponds to first angled region 22 of first clamp member 18. Second clamp member 28 further comprises a concave region forming recess 30 to receive protrusion 20 when clamping insulator 5 is in the closed position. Recess 30 is configured to accommodate the wire when first clamp member 18 is externally rotated so the wire can occupy the recess. After internal rotation of first clamp member 18, protrusion 20 is configured to contact the wire received into recess 30.

As shown in later figures, when first clamp member 18 engages second clamp member 28, first clamp member 18 and second clamp member 28 define hinge hole 48 to receive hinge 45. Protrusion 20 and recess 30 define a series of grooves 40 to receive inserts 42. Optionally, at least one insert 42 is positioned on a surface of protrusion 20 to provide this friction effect. In the illustrated embodiment, inserts 42 are corrugated. However, inserts of different texture and material may be used to provide a variety of retention forces, as needed, directly upon the electrical wire.

Figure 11:
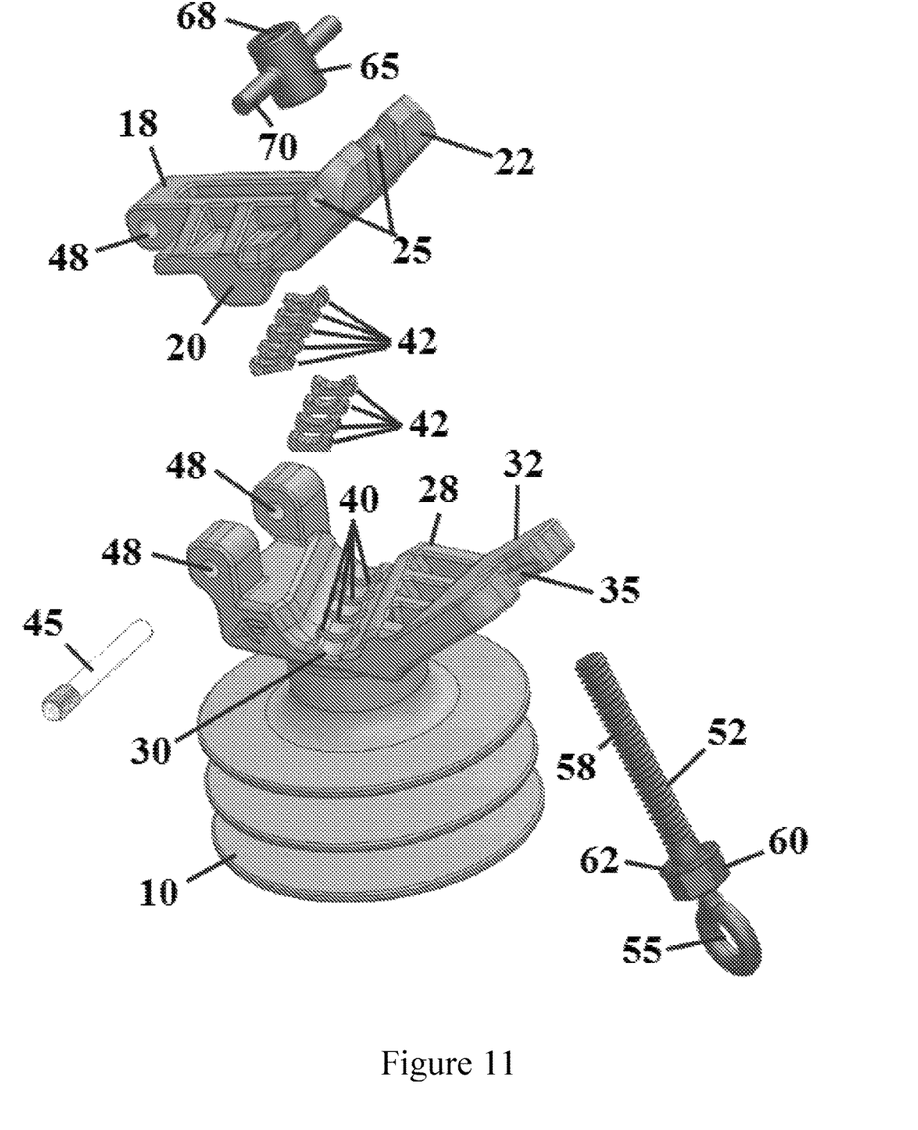
FIG. 11 is an exploded view of a clamping simulator, according to multiple embodiments and alternatives.

As will be illustrated in later figures, eyebolt 52 and eyebolt sleeve 65 are connected to clamp 15. Eyebolt 52 includes eyelet 55 to receive a hot stick which can be manipulated to secure an electrical wire in place to insulated clamp 5. Eyebolt 52 also consists of threaded screw 58, and nut 60 and washer 62 that are located on the distal end of eyebolt 52 between threaded screw 58 and eyelet 55. Eyebolt sleeve 65 includes eyebolt sleeve hole 68 to receive eyebolt 52, and in some embodiments sleeve 65 fits securely within a first fixture receiving notch 34 of first clamp member 18 as discussed below. As shown in FIG. 11, eyebolt sleeve hole 68 can be threaded to receive and secure eyebolt 52. Eyebolt sleeve 65 also consists of eyebolt sleeve hinge 70 which attaches to slot 25 of first clamp member 18.

Figure 2:
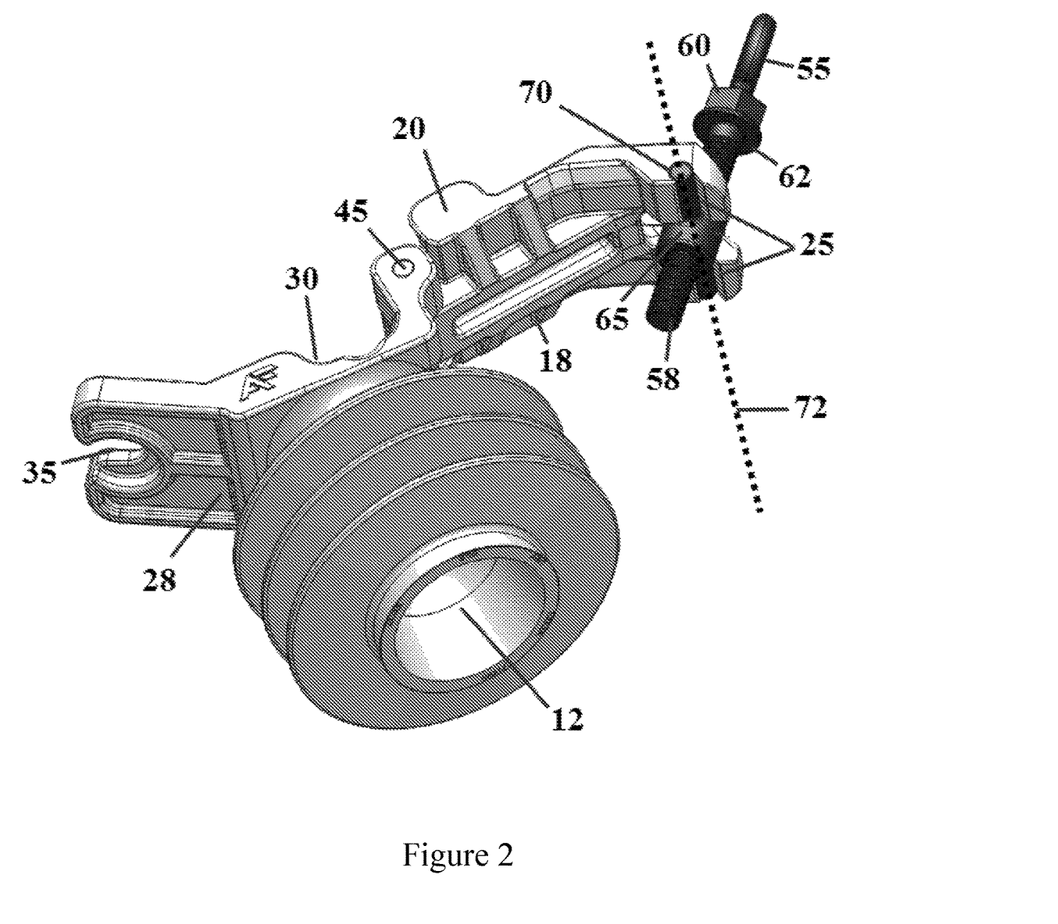
FIG. 2 is a perspective bottom view of a clamping insulator in an open position, according to multiple embodiments and alternatives.

FIG. 2 shows clamping insulator 5 in the open position. As illustrated, first clamp member 18 is attached rotatably to second clamp member 28 about hinge 45. First angled region 22 is where first fixture receiving notch 34 is positioned along with slot 25 to receive eyebolt sleeve hinge 70. In the open position, first clamp member 18 is positioned away from second clamp member 28. Moreover, eyebolt sleeve hinge 70 is secured to slot 25 of first clamp member 18. Threaded screw 58 is inserted into eyebolt sleeve hole 68 to attach eyebolt 52 to first clamp member 18. Eyebolt 52 is positioned away from clamping insulator 5 to allow for easier manipulation of the clamping insulator by a lineman.

Also, a second angled region 32 of second clamp member 28 is where a second fixture receiving notch 35 is positioned to receive the eyebolt with the clamp in an internally rotated position resulting in clamp closure to a degree selected by a user of the clamp, i.e., sufficient to exert a force upon the wire as protrusion 20 contacts the wire. Accordingly, the idea of clamp closure is a relative term, the degree of which may vary based on several factors including the diameter and size of the wire, but which in operation is marked by contact between the protrusion of the first clamp member and the wire. In general, however, clamp opening occurs when the distance between the first angled region and the second angled region (described below) becomes greater, while clamp closure occurs when this distance becomes smaller to the point where protrusion 20 contacts the wire.

To close clamping insulator 5, a lineman would use a hot stick to simply flip or fold first clamp member 18 upon second clamp member 28, without having to removing eyebolt 52, to secure an electrical wire in place. Upon closure of first clamp member 18 upon second clamp member 28, closing clamping insulator 5, and the internal rotation associated with closure causes eyebolt 52 to engage second fixture receiving notch 35 of second clamp member 28.

It will be understood that hollow region 12 of insulator 10 is not limited to the precise arrangement and scale shown in FIG. 2. Instead, hollow region 12 can be adapted to connect to a variety of support structures.

FIG. 3 also shows clamping insulator 5 in the open position. As illustrated, inserts 42 are attached to protrusion 20 and recess 30. To close clamping insulator 5, a lineman would simply fold first clamp member 18 closed without removing eyebolt 52. First clamp member 18 would then rotate about hinge axis 50 into the closed position, and the electrical wire would be secured in place. A lineman could then access eyelet 55 with a hot stick to tighten clamp 15 about the electrical wire.

Figure 4:
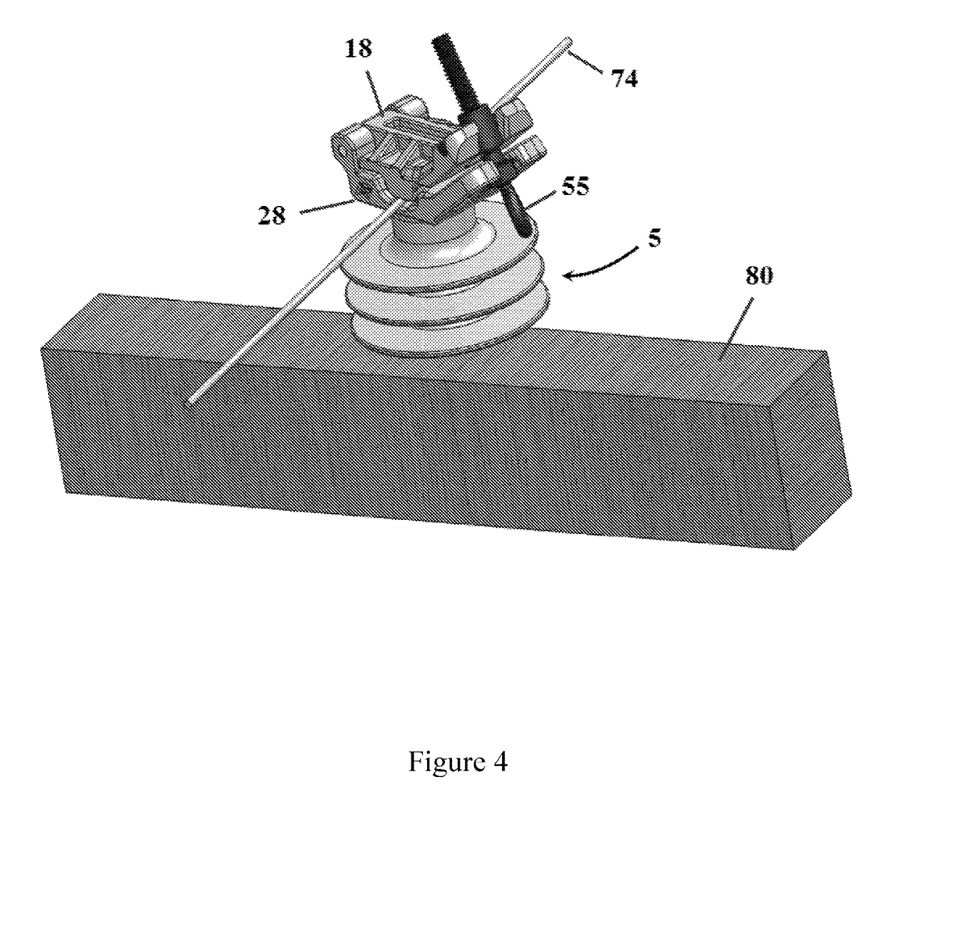
FIG. 4 is an elevation view of a closed clamping insulator on a support structure securing an electrical wire, according to multiple embodiments and alternatives.
Figure 5:
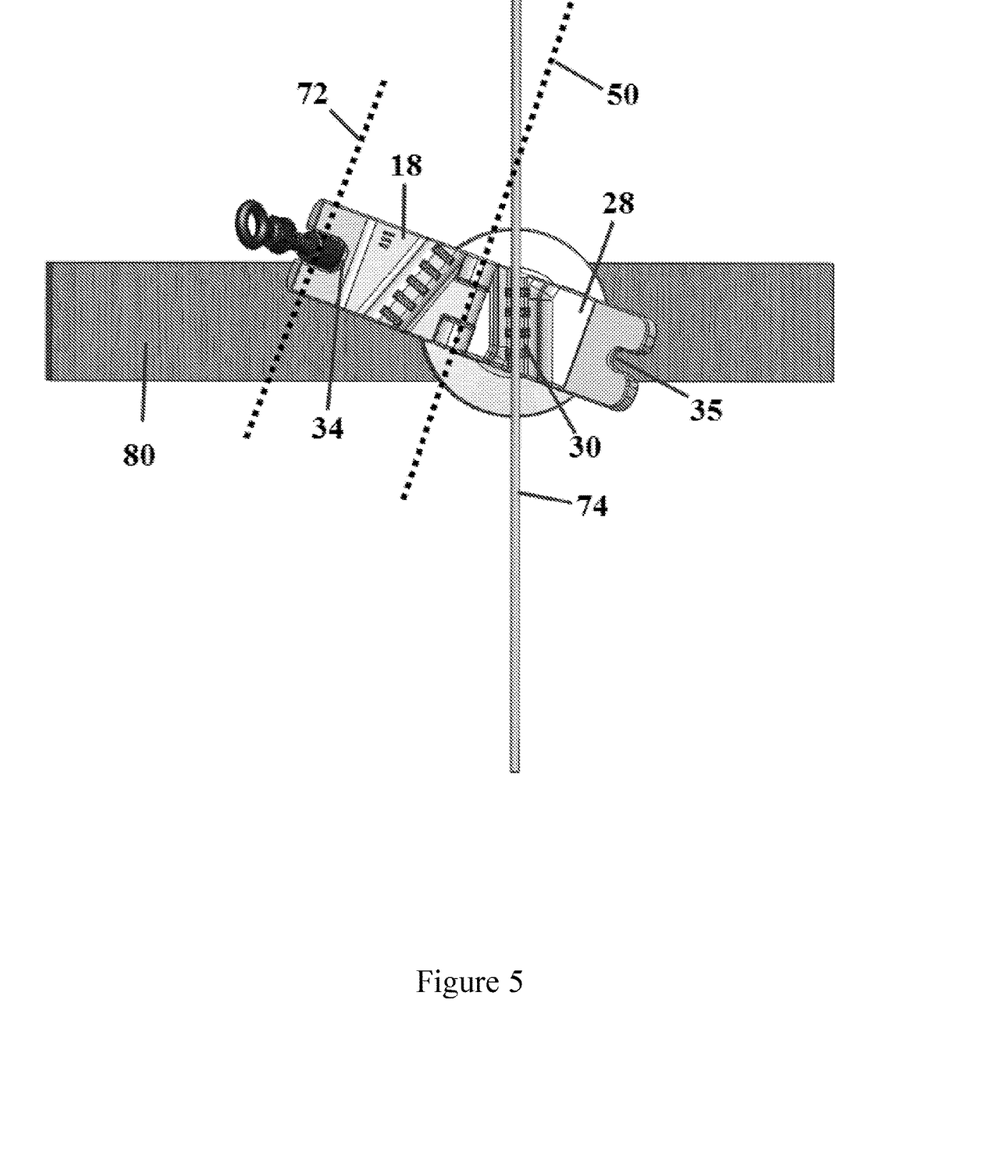
FIG. 5 is a plan view of an open clamping insulator on a support structure with an electrical wire resting on a recess of a clamp member, referred to elsewhere herein as a second clamp member, according to multiple embodiments and alternatives.
Figure 6:
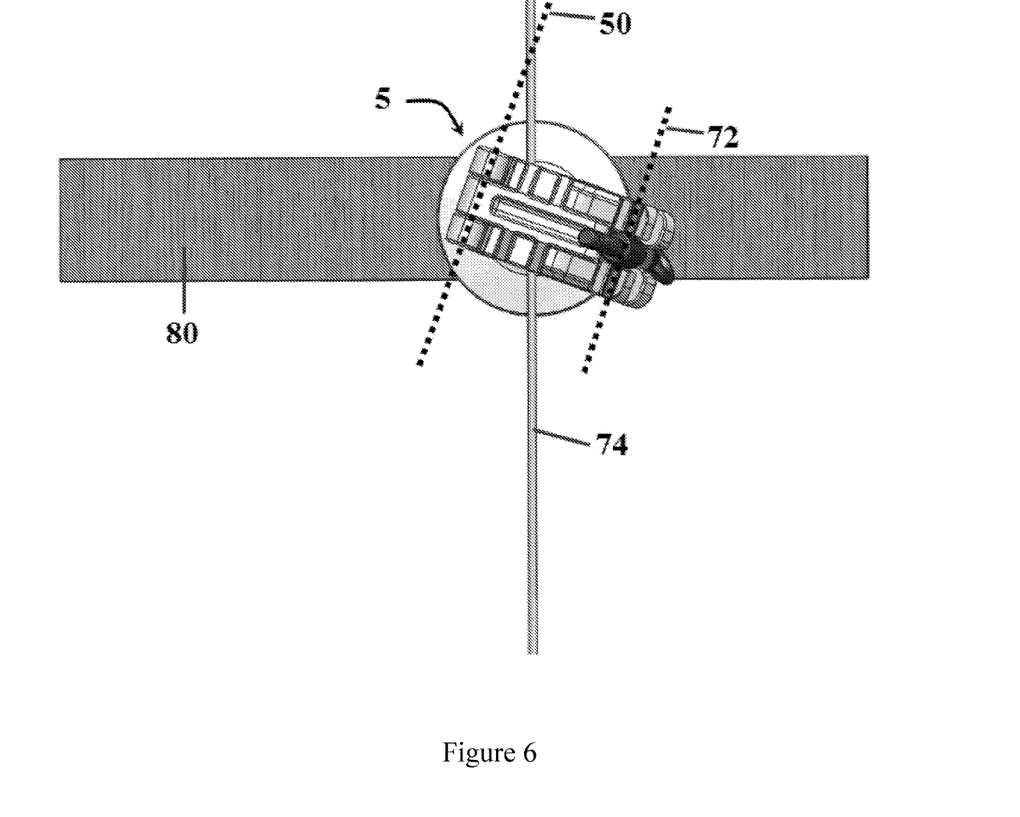
FIG. 6 is a plan view of a closed clamping insulator on a support structure securing an electrical wire, according to multiple embodiments and alternatives.

FIGS. 4-6 show clamping insulator 5 attached to support structure 80 (not claimed) and illustrate electrical wire 74 (not claimed) engaged with clamping insulator 5. FIG. 4 illustrates clamping insulator 5 in the closed position securing electrical wire 74 in place. In FIG. 4, eyelet 55 has been accessed by a hot stick and tightened such that first clamp member 18 and second clamp member 28 firmly engage and secure electrical wire 74 to clamping insulator 5.

FIG. 5 illustrates a top view of clamping insulator 5 in the open position, and electrical wire 74 rests in recess 30 of second clamp member 28. In some embodiments, as shown in this figure, first clamp member 18 also comprises first fixture receiving notch 34 and second clamp member 28 also comprises second fixture receiving notch 35.

FIG. 6 illustrates a top view of clamping insulator 5 in the closed position. As illustrated, hinge axis 50 is positioned at an angle relative to electrical wire 74. When a lineman folds first clamp member 18 into the closed position, first clamp member 18 rotates about hinge axis 50, inserts 42 engage electrical wire 74, and eyebolt 52 engages second fixture receiving notch 35 to secure electrical wire 74 in place. As compared to conventional electrical power line clamps in which the hinge axis is parallel to the electrical wire, the angular relationship between hinge axis 50 and electrical wire 74 results in more surface area of clamp 15 engaging with electrical wire 74 which provides greater bearing force directly on the wire to secure it in place.

As shown in various figures, including without limitation FIGS. 3, 5 and 10, hinge 45 serves as a pivot for first clamp member 18 to rotate internally and externally relative to second clamp member 28. Additionally, recess 30 has formed therein a channel 38 extending at an angle relative to hinge 45. This arrangement is noticeable in FIG. 3 among others wherein inserts 42 are positioned in the channel 38 as part of recess 30. From these views, it will be appreciated that in operation, after it is situated with the clamping apparatus, the wire 74 (best seen in FIG. 6) extends along channel 38 of second clamp member 28. In that position, during closure marked by internal rotation denoted by arrow 17', protrusion 20 of first clamp member 18 occupies the space associated with recess 30 of second clamp member 28, while leaving empty space for wire 74 to extend along channel 38. In this way, wire 74 is contacted by protrusion 20 of first clamp member 18 during internal rotation and closure.

Figure 7:
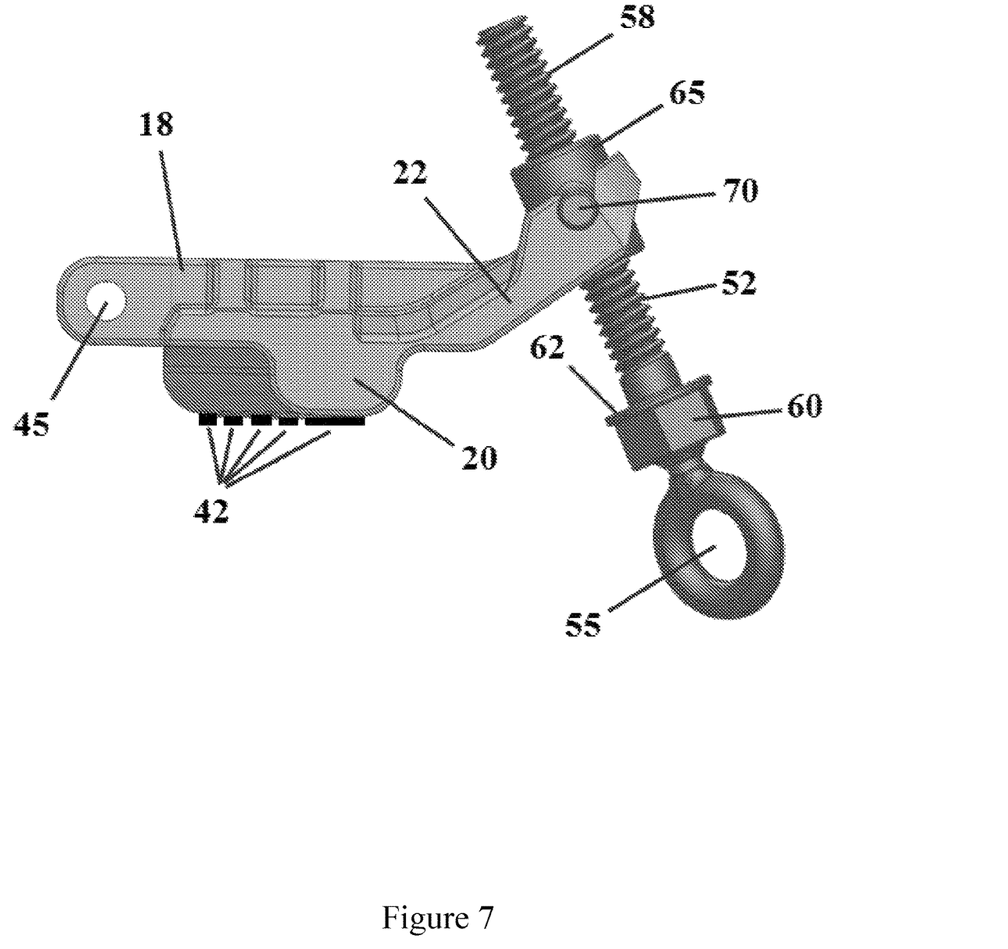
FIG. 7 is a partial side view of a first clamp member of a clamping insulator and eyebolt, according to multiple embodiments and alternatives.
Figure 8:
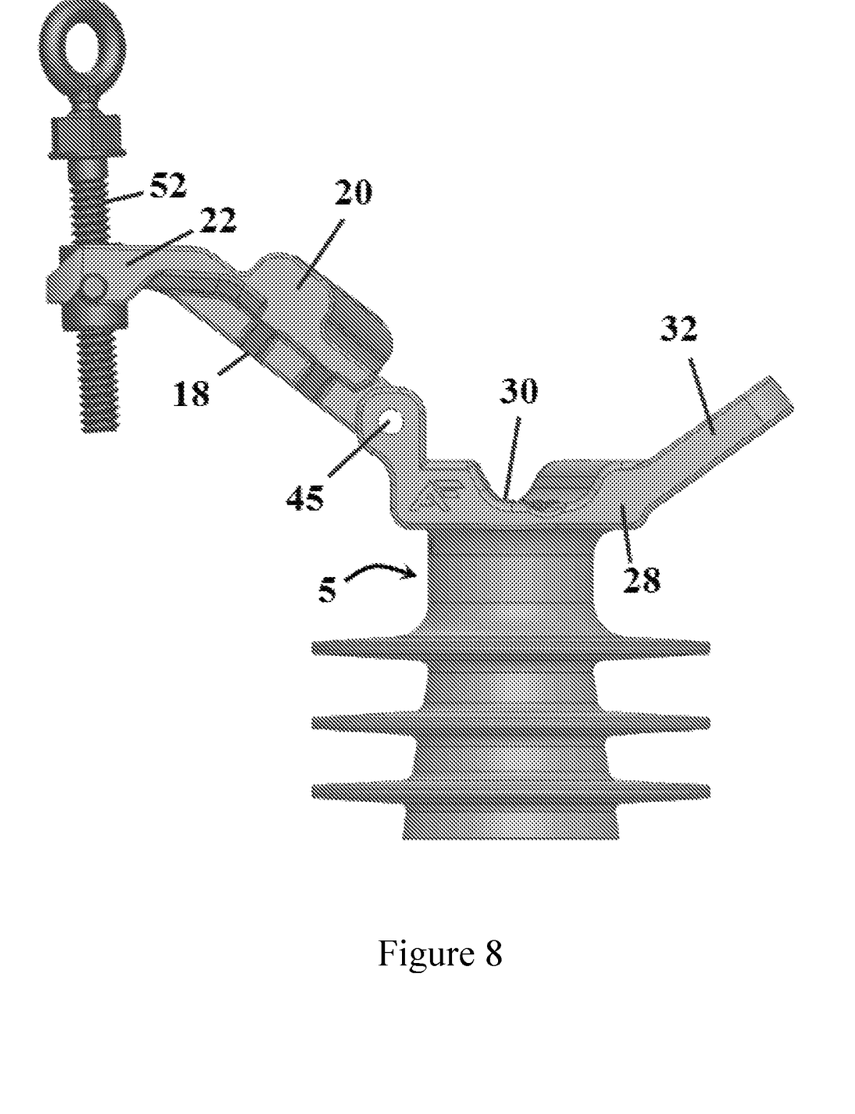
FIG. 8 is a side view of an open clamping insulator, according to multiple embodiments and alternatives.

FIG. 7 illustrates eyebolt 52 and eyebolt sleeve 65 connected to first clamp member 18. FIG. 8 illustrates clamping insulator 5 in the open position ready to secure an electrical wire. Second clamp member 28 comprises a concave region forming recess 30 to receive protrusion 20 when clamping insulator 5 is in the closed position. FIG. 9 illustrates clamping insulator 5 just after first clamp member 18—with a portion of eyebolt 52 engaging a first fixture receiving notch 34—folded over as by internal rotation onto second clamp member 28, with a different portion of eyebolt 52 engaging second fixture receiving notch 35. To secure clamp 15 about an electrical wire, a lineman would access eyelet 55 with a hot stick and rotate eyebolt 52 until eyebolt screw 58 is fully secured into eyebolt sleeve 65. FIG. 10 illustrates clamping insulator 5 after a lineman has fully secured eyebolt 52 into eyebolt sleeve 65. Protrusion 20 and recess 30 define channel 38 that the electrical wire passes through.

As illustrated in FIGS. 9a and 10, second angled region 32 of second clamp member corresponds to first angled region 22 such that when first clamp member 18 is in the closed position, fixture axis 72 is positioned at an angle relative to longitudinal axis 78. As previously noted, when first clamp member 18 is closed upon second clamp member 28, closing clamping insulator 5, and the internal rotation associated with closure causes eyebolt 52 to engage second fixture receiving notch 35 of second clamp member 28. When eyebolt 52 is positioned in both first fixture receiving notch 34 and second fixture receiving notch 35, eyebolt 52 is oriented along fixture axis 72. In some embodiments, the arrangement of first and second clamp members 18, 28 and the configuration of their respective angled regions 22, 32, is such that fixture axis 72 is positioned at an angle relative to longitudinal axis 78 ranging from about 10°-40° (i.e., about 10 degrees-40 degrees). In some embodiments, this angle is 30°. In some embodiments, this angle formed by fixture axis 72 and longitudinal axis 78 will approximate or be equal to the angle of the second angled region 32 discussed in connection with the second clamp member. The angled position of eyebolt 52 makes it much easier for a lineman to access eyelet 55 with a hotstick to install or remove clamping insulator 5.

Figure 9B:
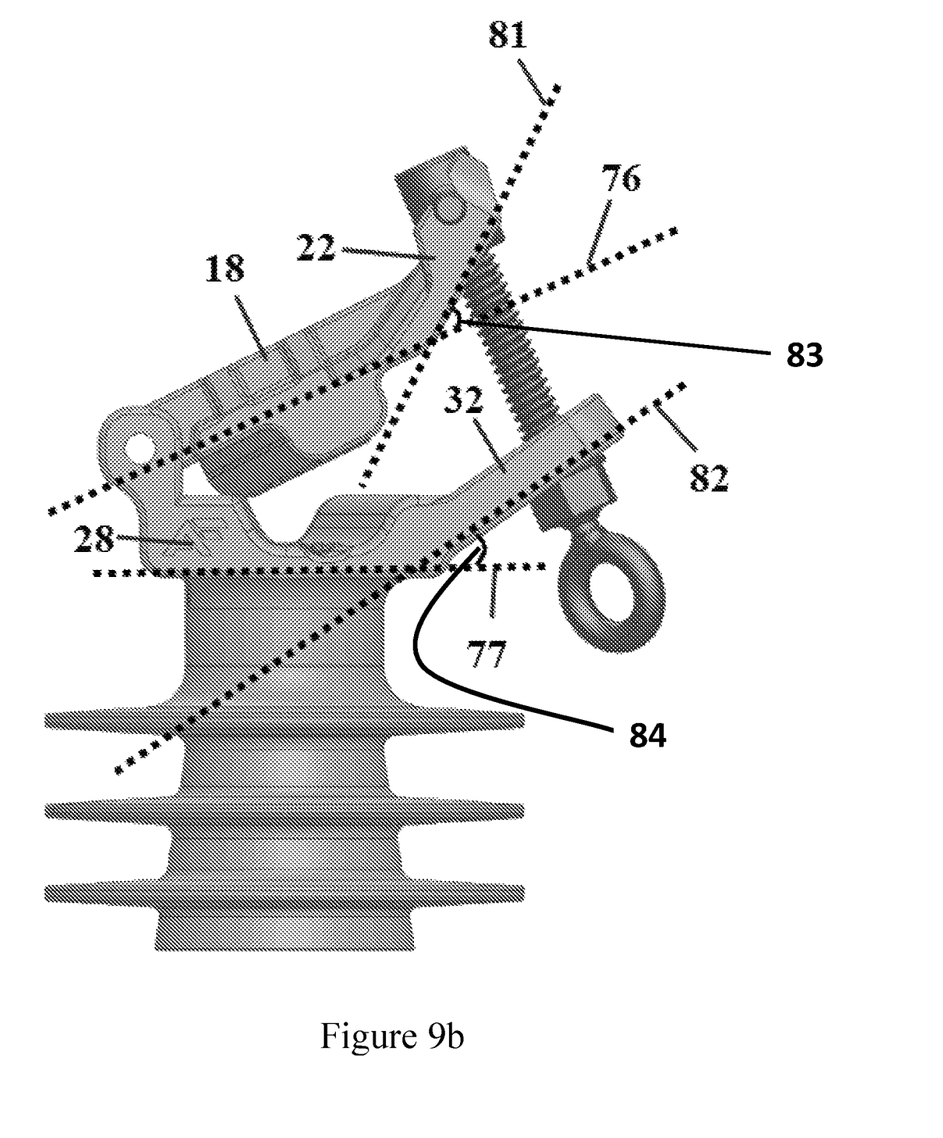
FIG. 9b is a side view of a partially closed clamping insulator with angled regions, according to multiple embodiments and alternatives.

Referring now to FIG. 9b, first angled region 22 defines lateral edge 81, and also defines a first angle 83 formed by first clamp member latitudinal axis 76 and lateral edge 81. Second angled region 32 defines lateral edge 82, and also defines a second angle 84 formed by second clamp member latitudinal axis 77 and lateral edge 82. When first clamp member 18 undergoes internal rotation to a sufficient degree, i.e., such that when protrusion 20 contacts the wire, it exerts a mechanical force directly upon the wire which is enhanced because of this intersection of the longitudinal axis 78 and fixture axis 72. This provides increased clamping force for the inventive clamps compared to conventional ones and the angle of the fixture facilitates the linemen in tightening or loosening the fixture, such as a fixture in the form of an eyebolt with an eyelet.

In certain embodiments as shown in FIGS. 8-10, channel 38 is closer to hinge 45 than the point equidistant hinge axis 50 and the distal portion of second angled region 32 of second clamp member 28, such that clamp 15 utilizes an "asymmetrical fulcrum" effect to secure an electrical wire. The "asymmetrical fulcrum" effect, combined with the angular relationship between hinge axis 50 and electrical wire 74 illustrated in FIGS. 5 and 6, produces more pressure leading to greater clamping force directly on the electrical wire to secure it in place.

Referring now to FIG. 11, insulator 10 is coupled to second clamp member 28 of clamp 15. Inserts 42 are placed into the series of grooves 40 as defined by protrusion 20 and recess 30. When first clamp member 18 engages second clamp member 28, first clamp member 18 and second clamp member 28 define hinge hole 48 to receive hinge 45. After hinge 45 is inserted into and secured inside hinge hole 48, first clamp member 18 rotates about hinge axis 50. Hinge axis 50 serves as the single axis of swivel for first clamp member 18. Eyebolt sleeve hinge 70 attaches to slot 25, thereby securing eyebolt sleeve to first clamp member 18. Eyebolt 52 is secured to eyebolt sleeve 65 by threading screw 58 into eyebolt sleeve hole 68.

In operation, clamping insulator 5 shall be pre-assembled. A lineman will then attach clamping insulator 5 to support structure 80 with hollow region 12 fitted over the support structure. A lineman will then use a hotstick to open clamping insulator 5 and rest electrical wire 74 onto recess 30 of second clamp member 28. To close the clamping insulator, a lineman would simply flip or fold first clamp member 18 over upon second clamp member 28, without removing eyebolt 52, in order to secure electrical wire 74 in place. A lineman would then access eyelet 55 with a hot stick and rotate eyebolt 52 until first clamp member 18 and second clamp member 28 fully secure electrical wire 74.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A clamping insulator for securing a wire relative to a utility support structure, comprising: a first clamp member; a second clamp member having a concave region forming a recess to accommodate the wire; a hinge that defines a clamp member hinge axis and rotatably attaches the first clamp member and second clamp member about the clamp member hinge axis; a fixture that secures the first clamp member in a first position relative to the second clamp member; and an insulator defining a longitudinal axis; wherein the clamp member hinge axis is not parallel to the recess.

2. The clamping insulator of claim 1, wherein the first clamp member comprises a first angled region that includes a first lateral edge and a first fixture receiving notch to receive a first portion of the fixture.

3. The clamping insulator of claim 2, wherein the second clamp member comprises a second angled region that includes a second lateral edge and a second fixture receiving notch to receive a second portion of the fixture.

4. The clamping insulator of claim 3, wherein positioning the fixture in the first and second fixture receiving notches defines a fixture axis that intersects at an angle relative to the longitudinal axis.

5. The clamping insulator of claim 4, wherein the angle of the fixture axis relative to the longitudinal axis is between about ten degrees (10°) and about forty degrees (40°).

6. The clamping insulator of claim 3, wherein the first clamp member defines a first latitudinal axis that forms an angle with the first lateral edge of the first clamp member that is between about ten degrees (10°) and about forty degrees (40°).

7. The clamping insulator of claim 6, wherein the second clamp member defines a second latitudinal axis that forms an angle with the second lateral edge of the second clamp member that is between about ten degrees (10°) and about forty degrees (40°).

8. The clamping insulator of claim 1, wherein the first clamp member further comprises a protrusion having a complementary shape to the concave region of the second clamp member such that the protrusion contacts the wire when the first clamp member and the second clamp member secure the wire therebetween.

9. The clamping insulator of claim 8, wherein the protrusion of the first clamp member comprises at least one insert for increasing friction between the first clamp member and the wire.

10. The clamping insulator of claim 8, wherein the second clamp member comprises a channel configured to accommodate the wire, and internal rotation of the first clamp member relative to the second clamp member closes the clamping insulator, wherein closing occurs when the protrusion contacts the wire occupying the channel.

* * * * *